United States Patent
Rathi et al.

(10) Patent No.: US 12,080,056 B1
(45) Date of Patent: Sep. 3, 2024

(54) PERFORMING EXPLANATION JOBS FOR COMPUTER VISION TASKS

(71) Applicant: Amazon Technologies, Inc., Seattle, WA (US)

(72) Inventors: Ashish Rajendra Rathi, San Jose, CA (US); Michele Donini, Berlin (DE); Tyler Stephen Hill, Los Altos, CA (US); Krishnaram Kenthapadi, Sunnyvale, CA (US); Xinyu Liu, Santa Clara, CA (US); Pinar Altin Yilmaz, Palo Alto, CA (US); Muhammad Bilal Zafar, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 17/535,909

(22) Filed: Nov. 26, 2021

(51) Int. Cl.
*G06V 10/70* (2022.01)
*G06T 7/10* (2017.01)
*G06V 10/764* (2022.01)
*G06V 10/77* (2022.01)
*G06V 20/50* (2022.01)

(52) U.S. Cl.
CPC ............. *G06V 10/87* (2022.01); *G06T 7/10* (2017.01); *G06V 10/764* (2022.01); *G06V 10/768* (2022.01); *G06V 10/7715* (2022.01); *G06V 20/50* (2022.01)

(58) Field of Classification Search
CPC .... G06V 10/87; G06V 10/764; G06V 10/768; G06V 10/7715; G06V 20/50; G06T 7/10
See application file for complete search history.

(56) References Cited

U.S. PATENT DOCUMENTS

| 10,623,581 B2 | 4/2020 | Rao et al. |
| 10,936,160 B2 | 3/2021 | Sieniek |
| 2021/0350004 A1 | 11/2021 | Rahnama-Moghaddam et al. |

FOREIGN PATENT DOCUMENTS

WO    WO-2020243583 A1 * 12/2020 ............... G06N 3/08

OTHER PUBLICATIONS

U.S. Appl. No. 17/106,013, filed Nov. 27, 2020, Sanjiv Das, et al.
U.S. Appl. No. 17/106,021, filed Nov. 27, 2020, Sanjiv Das, et al.
U.S. Appl. No. 17/106,029, filed Nov. 27, 2020, Sanjiv Das, et al.
U.S. Appl. No. 17/106,107, filed Nov. 27, 2020, Sanjiv Das, et al.
U.S. Appl. No. 17/362,729, filed Jun. 29, 2021, Himanshu Jindal, et al.
U.S. Appl. No. 17/535,932, filed Nov. 26, 2021, Xiaoguang Chen.

(Continued)

*Primary Examiner* — Mekonen T Bekele
(74) *Attorney, Agent, or Firm* — S. Scott Foster; Kowert, Hood, Munyon, Rankin & Goetzel, P.C.

(57) ABSTRACT

Explanation jobs may be performed for computer vision tasks. A request to execute an explanation job for a computer vision machine learning model may be received. The execution job may be performed, including extracting different features from the image, determining the respective relative importance values of the different features on inferences generated by the computer vision machine learning model. The result of the explanation job, including the generated heat maps may be provided.

20 Claims, 9 Drawing Sheets

(56) References Cited

OTHER PUBLICATIONS

U.S. Appl. No. 17/535,912, filed Nov. 26, 2021, Cedric Philippe Archambeau.
U.S. Appl. No. 17/535,942, filed Nov. 26, 2021, Cedric Philippe Archambeau.
U.S. Appl. No. 17/535,945, filed Nov. 26, 2021, Cedric Philippe Archambeau.
U.S. Appl. No. 17/535,946, filed Nov. 26, 2021, Cedric Philippe Archambeau.
Andrew Kapishnikov, et al., "XRAI: Better Attributions Through Regions", arXiv: 1906.02825v2; Aug. 20, 2019, pp. 1-12.

* cited by examiner

PERFORMING EXPLANATION JOBS FOR COMPUTER VISION TASKS

BACKGROUND

Machine-learned models and data-driven systems have been increasingly used to help make decisions in application domains such as financial services, healthcare, education, and human resources. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of performing explanation jobs for computer vision tasks are described herein. Because machine learning models can be shaped by many different factors when used in different application. For example, in various scenarios, understanding why a machine learning model made a decision (e.g,. a prediction or other inference) and what impacted that prediction may be important to determine whether a model is performing tasks correctly in applications that use the machine learning model. In order to ensure trust in various domains of application, reliable explanations for the behavior of machine learning models as well as insight into how such machine learning models make decisions, allowing for various users or systems that rely upon such decisions to have confidence in the provided decisions. In various scientific applications, understanding whether a machine learning model is making decisions based on noisy or irrelevant features may allow for machine learning model development to better proceed with a better understanding of a machine learning model's limitations and failure modes. In these, and various other scenarios, implementing techniques, such as those discussed below with regard to FIGS. 1-8, may improve the performance of applications that incorporate machine learning models, such as machine learning models that perform computer vision tasks, as well as the performance of other systems that rely upon decisions made by these applications.

Figure 1:
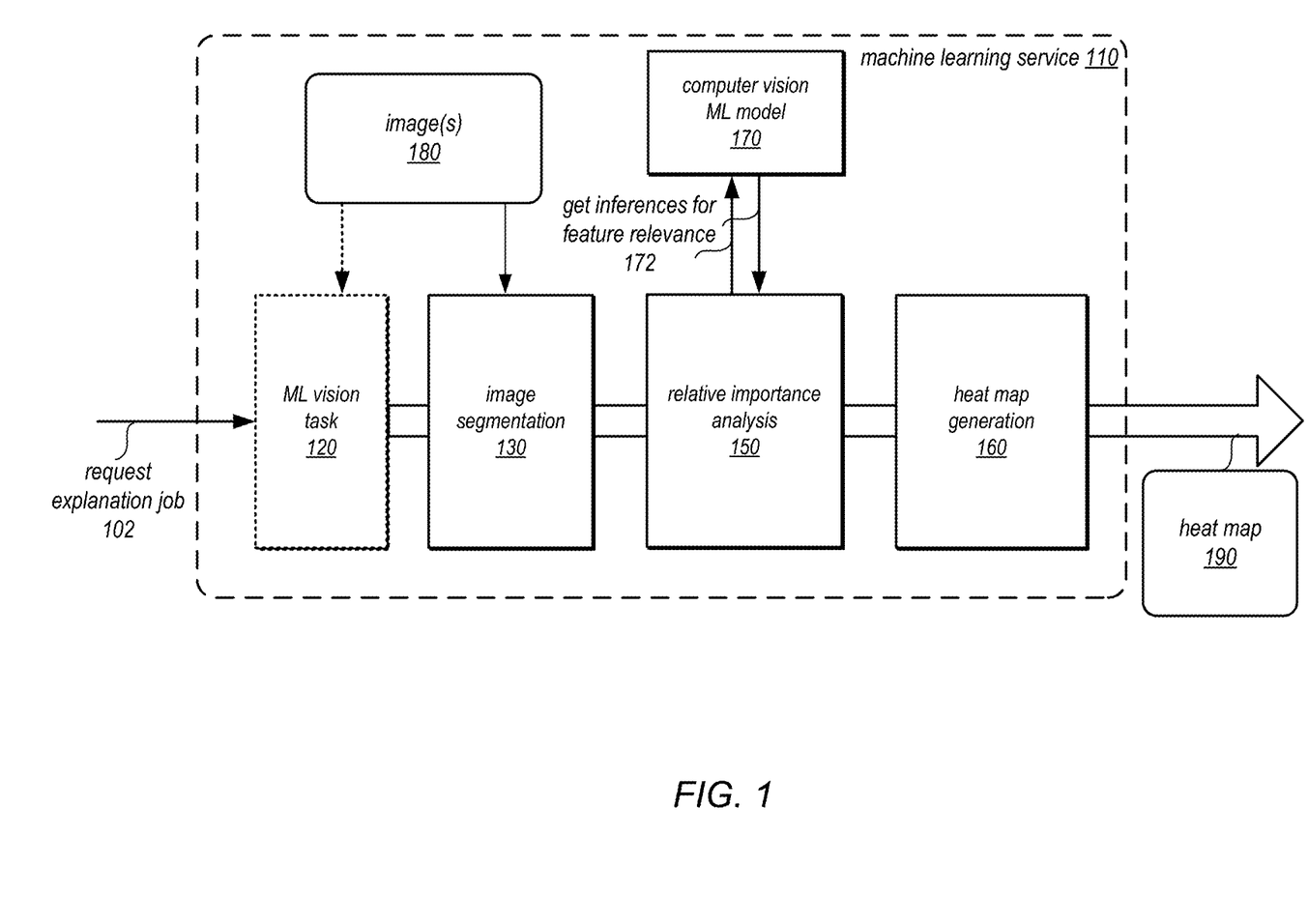
FIG. 1 illustrates a logical block diagram of performing explanation jobs for computer vision tasks, according to some embodiments.

FIG. 1 illustrates a logical block diagram of performing explanation jobs for computer vision tasks, according to some embodiments. Machine learning service 110 may be implemented as a standalone machine learning system that offers various machine learning development and deployment capabilities. In some embodiments, machine learning service may be implemented as part of a provider network, as discussed in detail below with regard to FIG. 2, which may offer a variety of different services including machine learning service 110. To provide greater insight into the performance of machine learning models, machine learning service 110 may support various analysis tools or features for machine learning models. One such feature is an explanation job, which may perform explainability analysis on machine learning model, such as computer vision ML model 170.

Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. Computer vision ML models, for example, may be trained using training data sets of image data and may also make inferences to perform various computer vision tasks, such as image classification, object detection, or image regression, among others.

Machine learning service 110 may support requests for explanation jobs 102 for a computer vision machine learning model 170. As discussed in detail below with regard to FIG. 3, an explanation job may include various features or parameters to guide or otherwise configure the performance of the explanation job. For example, request for explanation job may specify one image segmentation technique (out of multiple supported image segmentation techniques) to apply as part of image segmentation stage 130, including various segmentation performance parameters (e.g., number of segments and segment compactness). Explanation job requests may be received through various kinds of interfaces, such as graphical user interfaces (GUIs) (e.g., a visual console offered by machine learning service 110 to request various operations, a machine learning model development environment, such as development management environment 213 discussed below with regard to FIG. 2, a command line interface, or programmatically via an Application Programming Interface (API).

In some scenarios, an initial ML vision task 120 may be performed (e.g., in object detection), although in others it may not be performed (e.g., image classification). Image(s) 180 may be used to provide the explanation and may be provided to ML vision task 120 (or to image segmentation 130 if ML vision task 120 is not performed). Image(s) 180 may be one (or multiple) images which may be used to understand the performance of computer vision ML model 170. For example, image(s) 180 could be used to test "hard cases" or "common cases" to understand the performance of computer vision ML model 170 with respect to these different scenarios.

Image segmentation 130 may be an image segmentation technique to image(s) 180 (or portions of image(s) 180 provided by ML vision task 120) in order to extract different features (e.g., super pixels, which may be groupings of pixels that together make up a portion of an image which can be analyzed together). As noted above, a request to perform an explanation job may specify and the application of a selected image segmentation technique. For example, explanation job request may specify a Simple Linear Iterative Clustering (SLIC) segmentation technique. Other image segmentation techniques may be supported and selected, such as a graph-based image segmentation technique like Felzenszwalb, image grid partitioning, or SHAP Partition Explainer, among others.

Relative importance analysis 150 may then implement techniques, such as SHAP-based techniques like Kernel SHAP, to modify the image features in various ways and get inferences from model 170. For example, as discussed in detail below with regard to FIGS. 4-5 and 7-8, different computer vision tasks may be analyzed in different ways, using background image replacement, permutations to image data, and other features, like including surrounding image data as additional context, in order to produce different coalitions of test images which can then be used to get inferences for feature relevance, as indicated at 172. These modified images may be submitted along with a request for an inference to computer vision ML model 170. In this way, the changes in computer vision ML model performance 170, as indicated by the inferences returned in response to the different modified images may be used to determine the relative importance of different features (e.g., as Shapley values).

Heat map generation 160 may then generate heat map 190 as part of an explanation result provided for the requested explanation job. For example, heat map color shades may be arranged as a scale corresponding to a scale of feature importance values. Thus, the results of relative importance analysis assigning an importance value for each feature may take the importance value, map it to a shade, and then included it in a heat map image that colors that feature in the image with the corresponding heat map shade color. Note that other information may also be included. For example, the importance values along with the location information describing the features may be included as part of a result of the explanation job.

Please note that the previous description of is a logical illustration of performing explanation jobs for computer vision tasks and thus is not to be construed as limiting as to the machine learning system.

This specification continues with a general description of a provider network that implements multiple different services, including a machine learning service, which may implement performing explanation jobs for computer vision tasks. Then various examples of, including different components/modules, or arrangements of components/module that may implement staged bias measurements and feature attribution capture in machine learning pipelines are discussed. A number of different methods and techniques to implement performing explanation jobs for computer vision tasks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
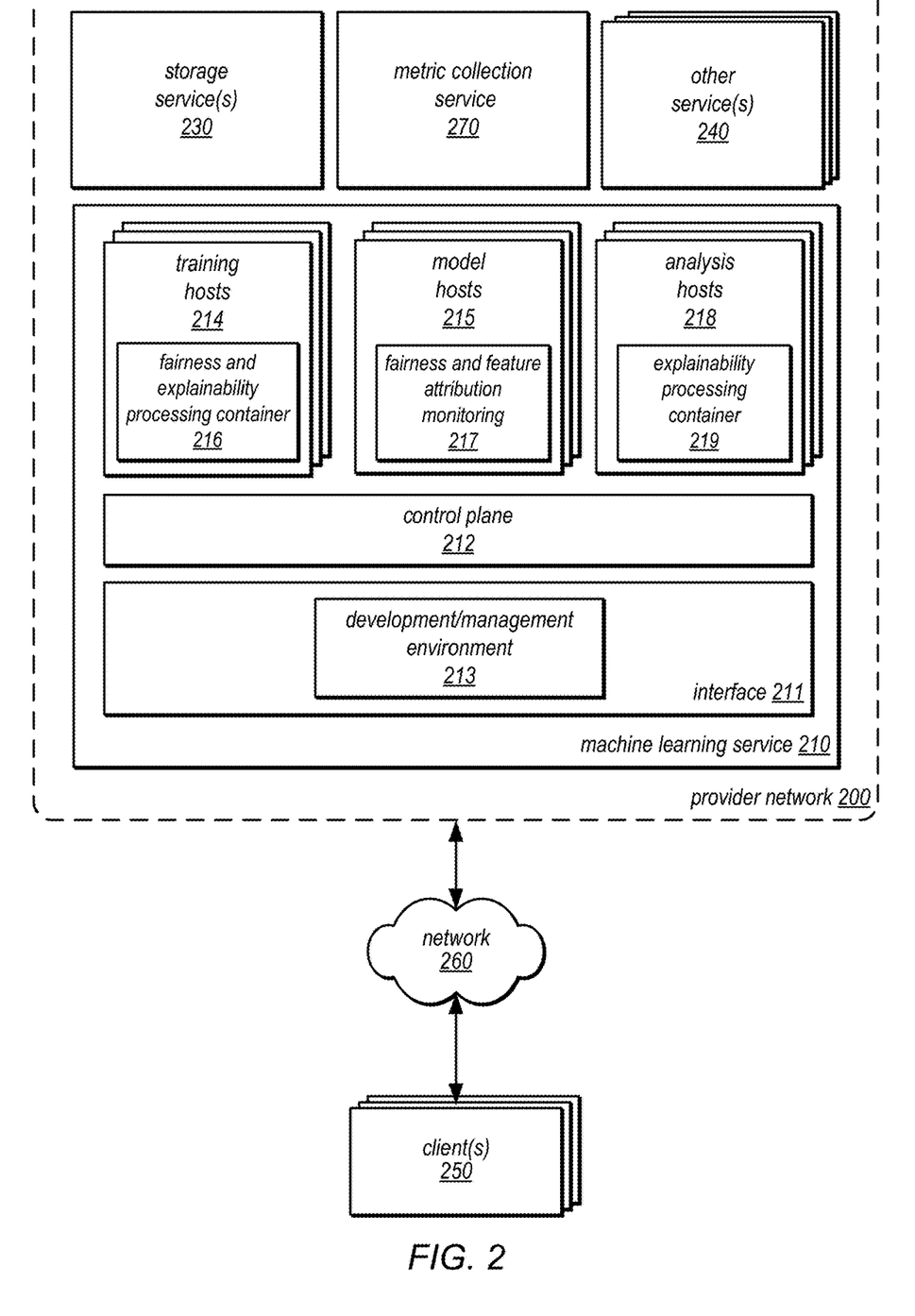
FIG. 2 illustrates an example provider network that may implement a machine learning service that performs explanation jobs for computer vision tasks, according to some embodiments.

FIG. 2 illustrates an example provider network that may implement a machine learning service that performs explanation jobs for computer vision tasks, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning 210 may implement interface 211 to allow clients (e.g., client(s) 250 or clients implemented internally within provider network 200, such as a client application hosted on another provider network service like an event driven code execution service or virtual compute service) to compress, train, and deploy machine learning models (e.g., neural networks). For example, machine learning service 210 may implement interface 211 (e.g., a graphical user interface, programmatic interface that implements Application Program Interfaces (APIs) and/or a command line interface) may be implemented so that a client can submit, edit, or otherwise provide a training job for a machine learning model stored in storage service(s) that requests uses a fairness and explainability processing container 215, or enables fairness and feature attribution monitoring 217, and/or in other storage locations within provider network 200 or external to provider network 200 (e.g., on premise data storage in private networks). For example, interface 211 may include development and management environment 213, which may provide a training script or other code editor with various development tools to create, submit, and/or monitor machine learning pipeline with a training job and/or monitoring job, as discussed below. Development and management environment 213 may be a graphical interface, in some embodiments, and may provide an interface to past results generated for other models, in some embodiments. Interface 211 may allow a client to request the performance of training, deployment, or other machine learning service features, in various embodiments.

Machine learning service 210 may implement a control plane 212 to perform various control operations to implement the features of machine learning service 210. For example, control plane may monitor the health and performance of requests at different components, such as model training on training nodes 214 and model deployment on model hosting nodes 215. If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model training nodes 214 to execute training jobs on various machine learning models using data sets, such as data sets 232 in storage services 230 across one or more training nodes (which may include one or more respective processing devices for training, such as GPUs). As discussed above with regard to FIG. 1, various explanation job results may be stored in storage service(s) 230. In some embodiments machine learning service 210 may offer various virtual machines, instances, containers, images, or other applications hosted components that may implement fairness and explainability processing container 216 (or similar to features including fairness and explainability processing container 216), as discussed in detail below.

In various embodiments, machine learning service 210 may implement model deployment 215, which may deploy a trained machine learning model on resources (e.g., virtual compute instances or containers) to receive and return inferences or other results according to requests or other inputs to the deployed model. In various embodiments, monitoring features, including fairness and feature attribution monitoring 217 may be implemented.

Figure 3:
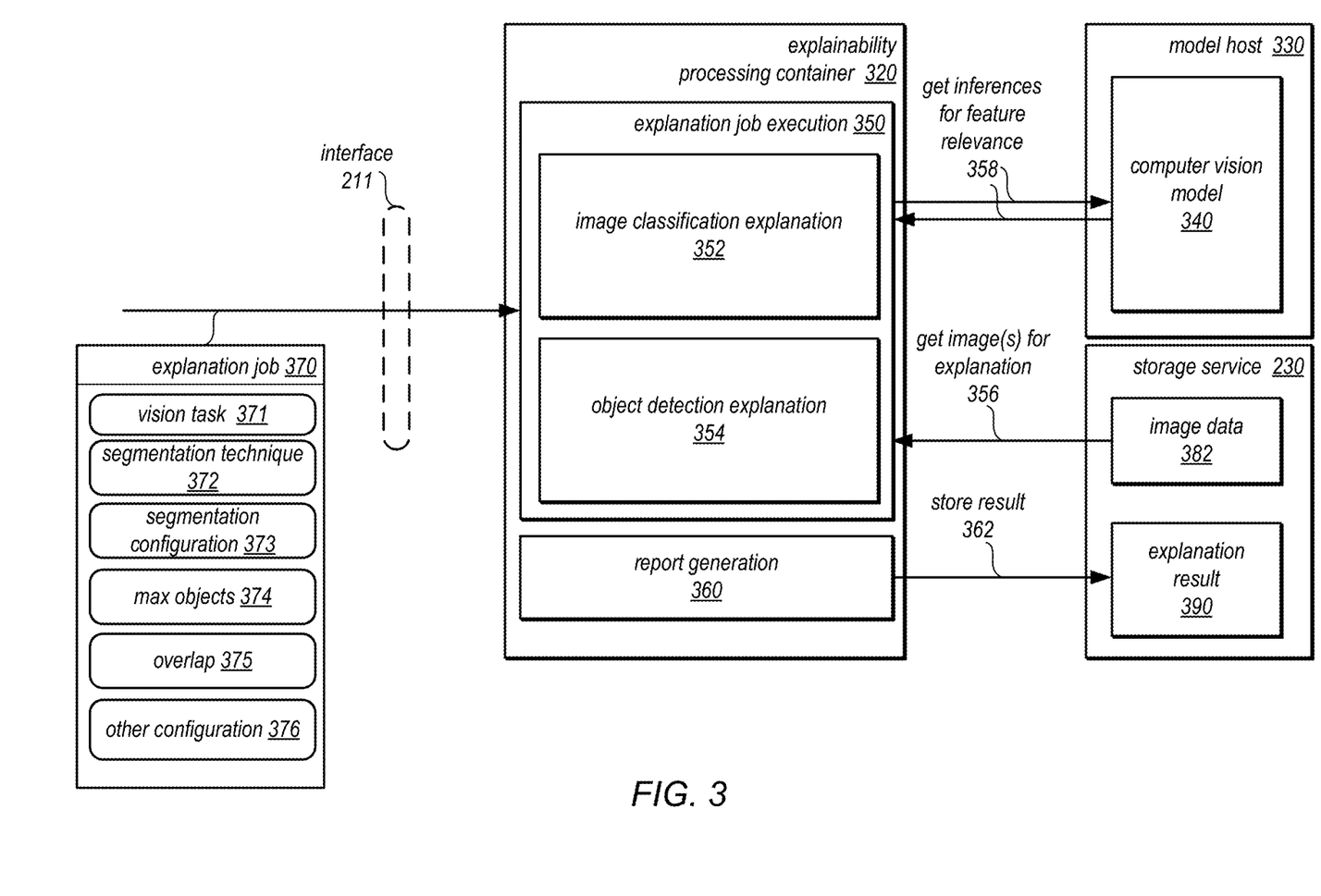
FIG. 3 illustrates a logical block diagram of an example explainability processing container that implements image classification and object detection explainability processing, according to some embodiments.

In various embodiments, machine learning service 210 may implement one or more analysis hosts 218 that implement explainability processing container 219, as discussed in detail below with regard to FIG. 3. Explainability processing container 219 may perform various explanation jobs, including explanation jobs for computer vision machine learning models.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Metric collection service 270 may receive, store, and/or aggregate various metrics from different services in provider network 200, which may then monitor and alert according to various conditions specified for the alerts. Various displays of metrics may be provided by monitoring service 270, in some embodiments.

Generally speaking, clients 250 may encompass any type of client that can submit network-based requests to provider network 200 via network 260, including requests for machine learning service 210 (e.g., a request to create or perform an explanation job, interact with development and management environment 213, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to configure or perform explanation jobs) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Machine learning pipelines may be implemented on one or more computing resources, such as training nodes 214 (which may be a single or group of multiple nodes (e.g,. a cluster)) executing a data processing application that can implement various machine learning frameworks (e.g., Tensorflow, Pytorch, MxNet, etc.). Different resources may be implemented or instantiated on behalf of a client of machine learning service to implement a machine learning pipeline 100 (or portions thereof). FIG. 3 illustrates a logical block diagram of an example explainability processing container that implements image classification and object detection explainability processing, according to some embodiments. A container may be implemented as part of a virtualization framework, like Operating System virtualization. Other virtualization techniques, such as micro virtual machines, may be used to implement various features similar to those described in FIG. 3.

Explainability processing container 320 (which may be similar to container 219) may receive through interface 211 an explanation job 370. Explanation job 370 may include a configuration that specifies various aspects of performing the explanation job, including which vision task 371 (e.g., image classification, image regression, object detection, or other supported vision tasks) as well as an identifier for a hosted model (e.g., a predictor), a segmentation technique 372 (a selected one out of a plurality of supported segmentation techniques), segmentation configuration 373 (such as number of segments, segment compactness, etc.), maximum number of detected objects 374, overlap 375 (e.g., used to determine an amount of perturbation of image data around a bounding box line), and other configuration information 376, including a context parameter for including surrounding image data outside of a bounding box for objection detection explanations, a background image for performing analysis, a probability threshold for detected object in object detection tasks, a location of input image(s) for explanation, etc . . . .

In some embodiments, an explanation job 370 may be specified in an analysis configuration, which may be written in various scripts or other languages, such as Javascript Object Notation (JSON). For example, below is an example of an analysis configuration file for an explanation job:
"dataset_type": "application/x-image",
"dataset_uri": "storage service://<OBJECT_ID>",
"probability_threshold": 0.7,
"methods": {
  "shap": {
  "image_algorithm": "OBJECT_DETECTION",
  "baseline":"background_image.png",
  "num_samples": 500,
  "feature_extraction_method": "SLIC_Segmentation",
  "num_segments": 20,
  "segment_compactness": 5,
  "max_objects": 3,
  "overlap": 0.5,
  "context": 1.0,
  "debug": {
    "image_names": ["buz"],
    "class_ids": [0, 5],
    "sample_from": 0,
    "sample_to": 20
  }
}
},
predictor": {
  "endpoint_name":"object-detector2",
  "content_type": "image/jpeg",
  "label_headers": [ . . . ]
}

Explanation processing container 320 may implement explanation job execution 350 to perform explanation jobs as configured and in response to the explanation job request. Explanation processing container 320 may implement different vision task explanation processing features, such as image classification explanation 352 for ML models that perform image classification tasks, and object detection explanation 354 for ML models that perform object detection tasks, according to the techniques discussed below with regard to FIGS. 4-8. For example, a Kernel SHAP analysis technique may be implemented to generate Shapley values (sometimes referred to as SHAP values) for each of the different features (e.g., super pixels) extracted from images, as discussed above with regard to FIG. 1 and below with regard to FIGS. 6-8. Explanation job execution 350 may get images 356 from image data 382 in storage service 230 and perform requests to get inferences for feature relevance 358 to computer vision model 340 in model host 330. A result may be generated at report generation 360 and stored 362 as explanation result 390 in storage service 230 (it may also be displayed via interface 211).

Figure 4:
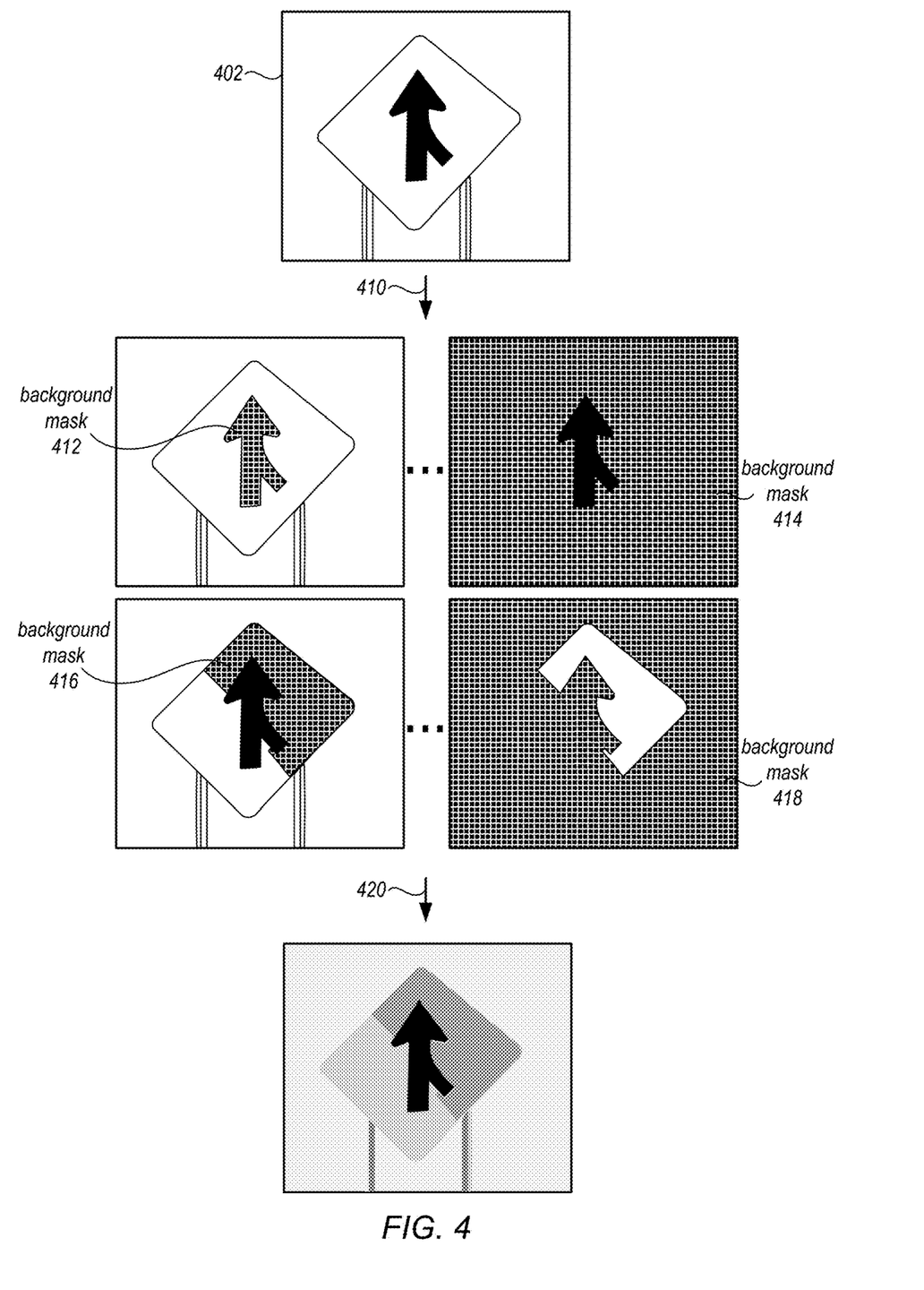
FIG. 4 illustrates a logical block diagram illustrating explainability processing for image classification, according to some embodiments.

FIG. 4 illustrates a logical block diagram illustrating explainability processing for image classification, according to some embodiments. An input image 402 may be obtained and may be segmented according to an image segmentation technique (e.g., as specified in an explanation job). A number of segments to be extracted, as well as their compactness, may be specified according to the configuration of the explanation job. These extracted features may be used to perform a SHAP-based attribution analysis.

For example, after image segmentation at 410, different features (or groups of features) may be replaced with a background mask (which may be specified by in explanation job and may include images that are visual noise, similar to other background features in the image, or various other types of image data which may be used to perform explainability analysis), as indicated at 412, 414, 416, and 418. Note that multiple other images with background masks may be produced, and that the illustrated images are merely examples of some possible images that may be produced.

Requests to perform image classification on the different images with the different background masks may be made using the computer vision machine learning model being explained. Inferences may be returned as results to the requests (e.g., labels and confidence scores). After all of the inferences generated as a result of the background masks are received, SHAP values may be generated to indicate their relative importance. SHAP values for the segments may be used to generate a heat map, as indicated after 420. In some embodiments multiple heat maps may be aggregated that are generated for similar types of objects being classified in image data to visualize whether the same features are important to classifying the same objects.

Figure 5:
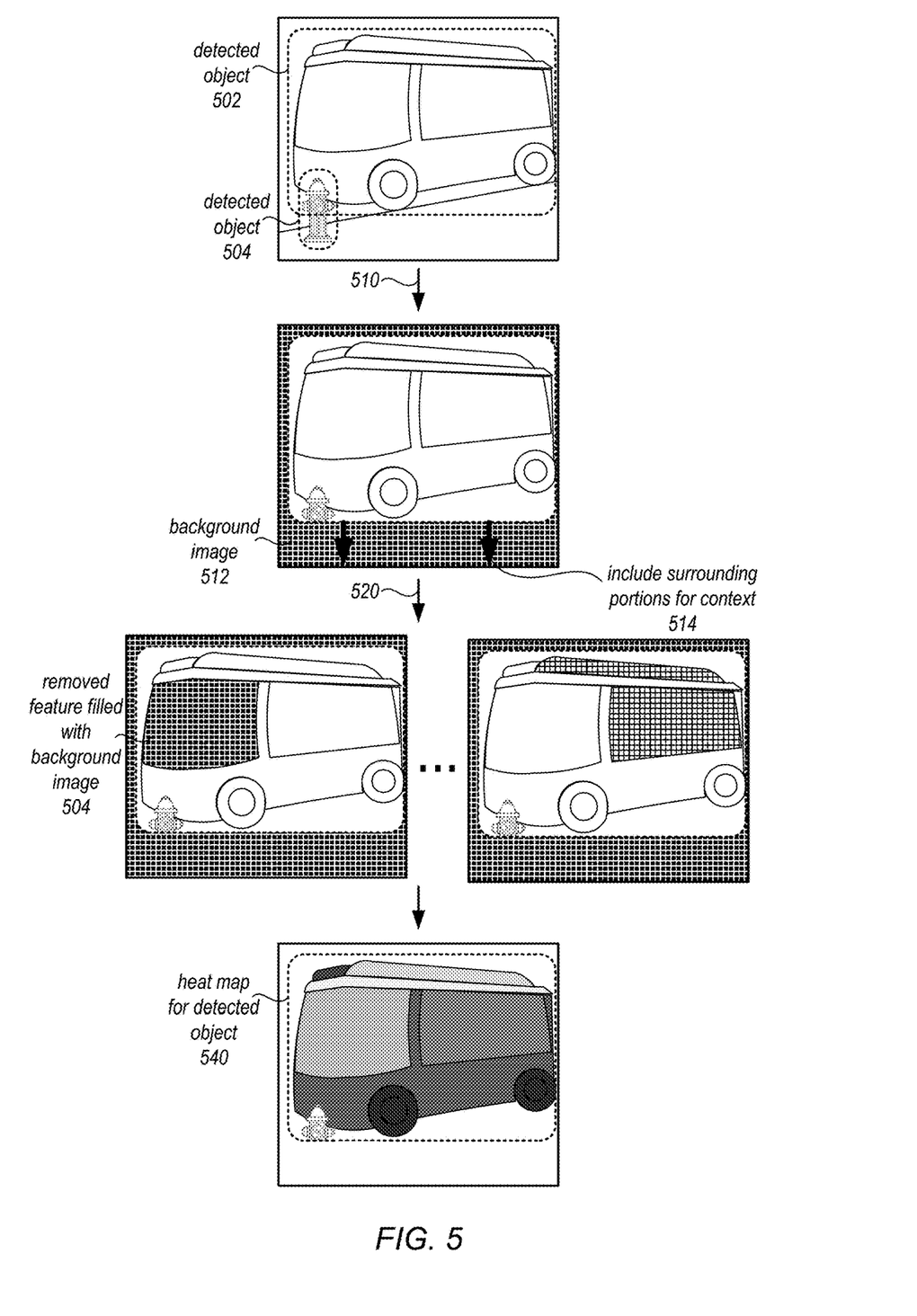
FIG. 5 illustrates a logical block diagram illustrating explainability processing for object detection, according to some embodiments.

FIG. 5 illustrates a logical block diagram illustrating explainability processing for object detection, according to some embodiments. An image may be obtained. An object detection model may be used to detect different objects in the image, such as detected object 502 and detected object 504. As indicated after 510, a detected object may be superimposed upon a background image 512. Different coalitions of images may be determined with some features removed and filled with background image, as indicated at 504, features permuted, including the bounding box according to an overlap parameter and/or to include additional, surrounding image data, as indicated at 514, according to a context parameter, in some embodiments. This may be performed many times in order to generate SHAP values for the different features of a detected object, which may then be used to shade the different features of the object as a heat map, for the detected object, as indicated at 540.

Although FIGS. 2-5 have been described and illustrated in the context of a provider network implementing a machine learning service, the various components illustrated and described in FIGS. 2-5 may be easily applied to other machine learning systems that use model performance explanations for machine learning models. As such, FIGS. 2-5 are not intended to be limiting as to other embodiments of performing explanation jobs for computer vision tasks.

Figure 6:
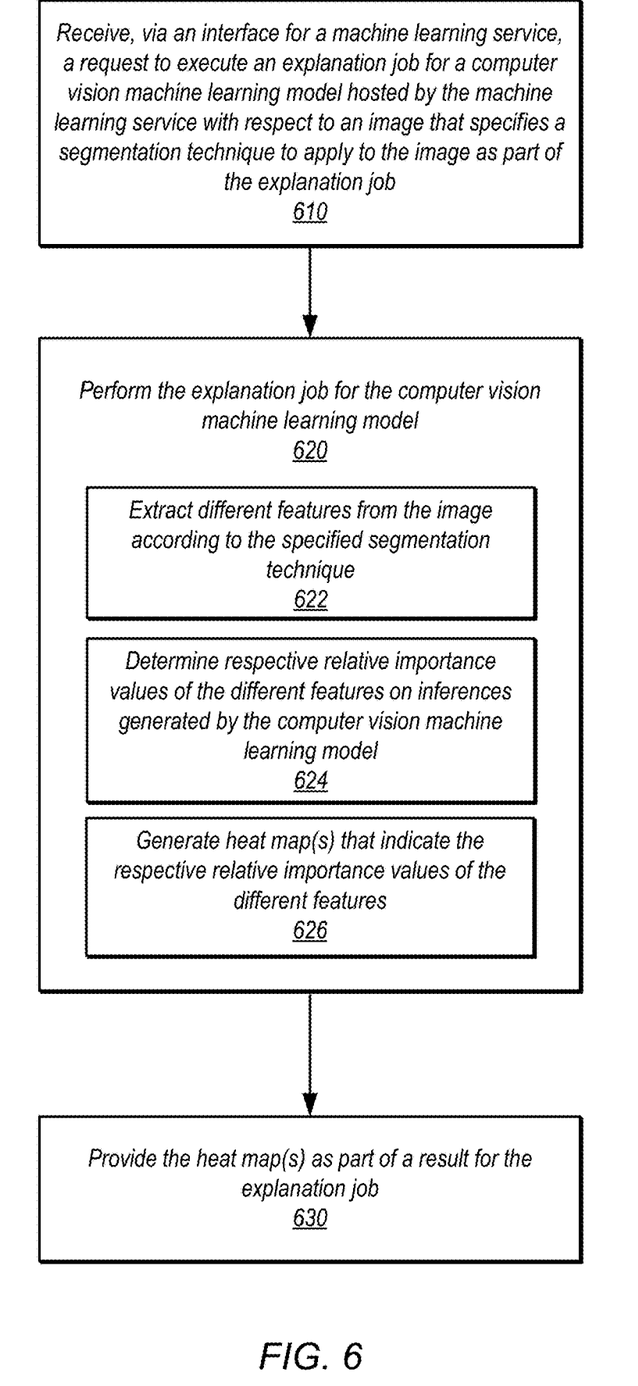
FIG. 6 is a high-level flowchart illustrating various methods and techniques for performing explanation jobs for computer vision tasks, according to some embodiments.

FIG. 6 is a high-level flowchart illustrating various methods and techniques for performing explanation jobs for computer vision tasks, according to some embodiments. As indicated at 610, a request may be received via an interface for a machine learning service to execute an explanation job for a computer vision machine learning model hosted by the machine learning service with respect to an image. In some embodiments, the image may be one of a batch of images that are used for the explanation job. The explanation job may be specified directly in the request or in a separate configuration file, document, or other object provided to the machine learning service. As discussed above with regard to FIG. 3, the configuration of the explanation job may include various features or parameters, including a vision task, an identifier for the hosted model, a segmentation technique, a number of segments, segment compactness, maximum number of detected objects, probability threshold for detected objects, overlap, context, a background image for performing analysis, a location of input image(s) for explanation, among other information.

As indicated at 620, the explanation job may be performed for the computer vision machine learning model, in some embodiments. As indicated at 622, different features may be extracted from the image according to the segmentation technique specified for the explanation job (e.g., in the request or in the configuration of the explanation job). For example, different segmentation techniques may be used to identify super pixels or other features of the image. In some embodiments, the features may be taken from the entire image (e.g., for image classification) or from a subset of the image (e.g., from a portion of the image corresponding to a detected object bounding box).

As indicated at 624, respective relative importance values of the different features may be determined on inferences generated by the computer vision machine learning model. For example, the relative importance values may be indicated by feature attribution values that attribute the influence of a feature to an inference produced by the computer vision model. Feature importance (sometimes referred to as feature attribution) may be determined using Shapley values. Feature attribution measurements can be provided at a local level, for a specific prediction made by the computer vision machine learning model and at a global level for the computer vision machine learning model as a whole. For example, in some embodiments, the feature attributions may be the Shapley values in a game (e.g., from game theory) where the total payoff is the model prediction with all the features included, and the players are the individual features. Taking the example of a college admission scenario, consider a model with features {SAT Score, GPA, Class Rank}, where it is desirable to explain the model prediction for a candidate. The range of model prediction is 0-1. The prediction for a candidate is 0.95. Then in the game, the total payoff would be 0.95 and the players would be the three individual features. If for the candidate, the Shapley values are {0.65, 0.7, −0.4}, then it may be determined that the GPA affects the prediction the most, followed by the SAT score. It may also be determined that while GPA and SAT score affect the prediction positively, the class rank affects it negatively (note that a lower rank is better).

In some embodiments, a Shapley value based technique for determining feature attribution may be implemented, such as Kernel SHAP. Such a technique may include creating a set of feature coalitions for the features from the image, by masking or fixing features and permuting others (as illustrated above with regard to FIGS. 4 and 5). Then inferences may be generated by applying the computer vision machine learning model to each of the feature coalitions, and local explanations generated (e.g., using Shapley values). Then after the inferences and local explanations are determined for each of the feature coalitions, an aggregation of local explanations may be performed to generate a global explanation for the computer vision machine learning model.

As indicated at 626, heat map(s) may be generated for the respective relative importance values (e.g., of local explanation) that indicate the respective relative importance of the different features on the performance of the computer vision machine learning model. For example, a scale that maps different shades of one (or more) colors to different importance values may be used to shade the different features of the image to produce the heat map.

As indicated at 630, the heat map(s) may be provided as part of a result for the explanation job, in some embodiments. The heat map(s) may then be stored in a storage location (e.g., in a document) and/or displayed via a user interface (e.g., a graphical display).

Figure 7:
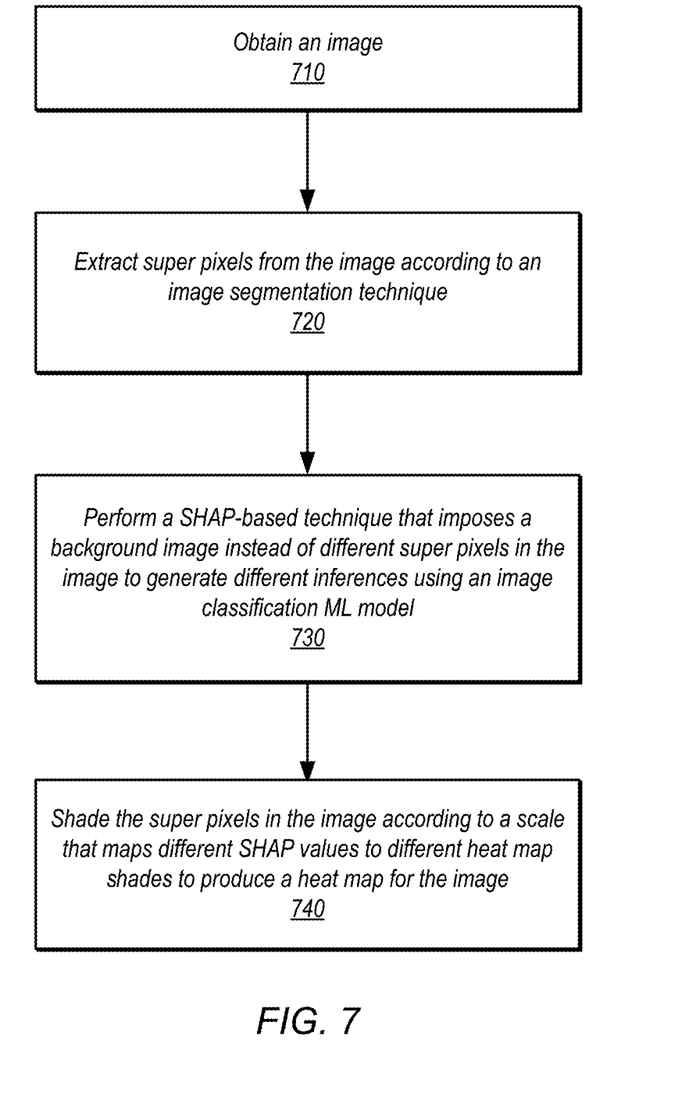
FIG. 7 is a high-level flowchart illustrating various methods and techniques for performing explanation jobs for an image classification task, according to some embodiments.

FIG. 7 is a high-level flowchart illustrating various methods and techniques for performing explanation jobs for an image classification task, according to some embodiments. As indicated at 710, an image may be obtained. As indicated at 720, super pixels may be extracted from the image according to an image segmentation technique, in some embodiments. As indicated at 730, a SHAP-based technique (as discussed above at element 624 of FIG. 6) may be implemented that imposes a background image instead of different super pixels in the image to generate different inferences using an image classification machine learning model, in some embodiments. Other image modifications, such as modifying the values of pixels, such as perturbing pixel values near edges or other portions of an image, may also be used to generate images for obtaining inferences.

As indicated at 740, the super pixels in the image may be shaded according to a scale that maps different SHAP values to different heat map shades to produce a heat map for the image, in some embodiments, which indicates the relative importance of each feature to producing an image classification inference (e.g., a label for the image and confidence score of the label) by the computer vision machine learning model that performs image classification tasks. In some embodiments, multiple heat maps generated for images with similar objects that result in a same classification may be combined as an aggregate heat map in order to determine whether any similarity in importance can be identified for the different features of a class of image that influence the model.

Figure 8:
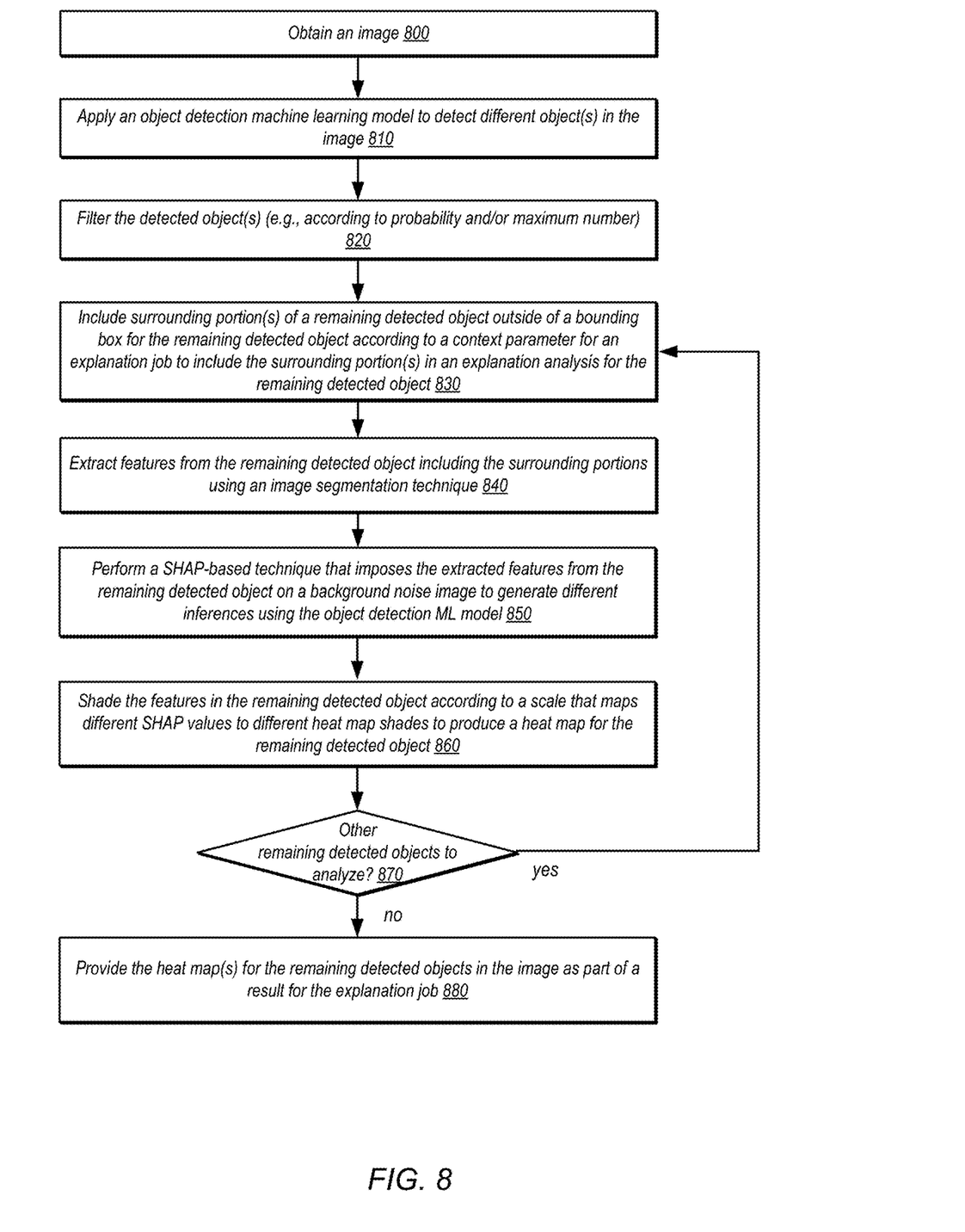
FIG. 8 is a high-level flowchart illustrating various methods and techniques for performing explanation jobs for an object detection task, according to some embodiments.

FIG. 8 is a high-level flowchart illustrating various methods and techniques for performing explanation jobs for an object detection task, according to some embodiments. As indicated at 800, an image may be obtained. As indicated at 810, an object detection machine learning model may be applied to detect different object(s) in the image. As indicated at 820, the detected objects may be filtered. For example, a probability (or confidence score) threshold may be enforced so that detect object that do not achieve that minimum confidence score will not be considered for an explanation analysis. In some embodiments, a maximum number of detected objects may be enforced. For example, if only 5 objects may be considered for explanation analysis, different techniques for choosing the 5 objects may be used (e.g., five object with the highest confidence scores, first five objects detected, five largest objects, etc.).

Each of the remaining detected objects may be considered for analysis. As indicated at 830, surrounding portion(s) of a remaining detected object outside a bounding box for the remaining detected object may be included according to a context parameter for an explanation job to include the surrounding portion(s) in an explanation analysis for the remaining detected object. For example, a context parameter which may indicate the amount of surrounding portions to include may be included in the configuration of an explanation job. The higher the context value, for instance, the greater amount of surrounding image data may be included.

As indicated at 840, features may be extracted from the remaining detected object including the surrounding portions using an image segmentation technique (e.g., as specified in the configuration of the explanation job). As indicated at 850, a SHAP-based technique that imposes the extracted features from the remaining detected object on a background image to generated different inferences using the object detection ML model (as discussed in detail above with regard to FIGS. 5 and 6, element 624). As indicated at 860, the features in the remaining detected object may be shaded according to a scale that maps different SHAP values to different heat map shades to produce a heat map for the remaining detected object, in some embodiments.

As indicated at 870, the technique may repeat while other detected objects remain to be considered. As indicated at 880, the generated heat map(s) may then be provided as part of a result for the explanation job. Other information, such as text information describing the bounding boxes, the labels of the detected object, the confidence scores for the labels, and performance results of the analysis, such as the Shapley values may also be included in the results.

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
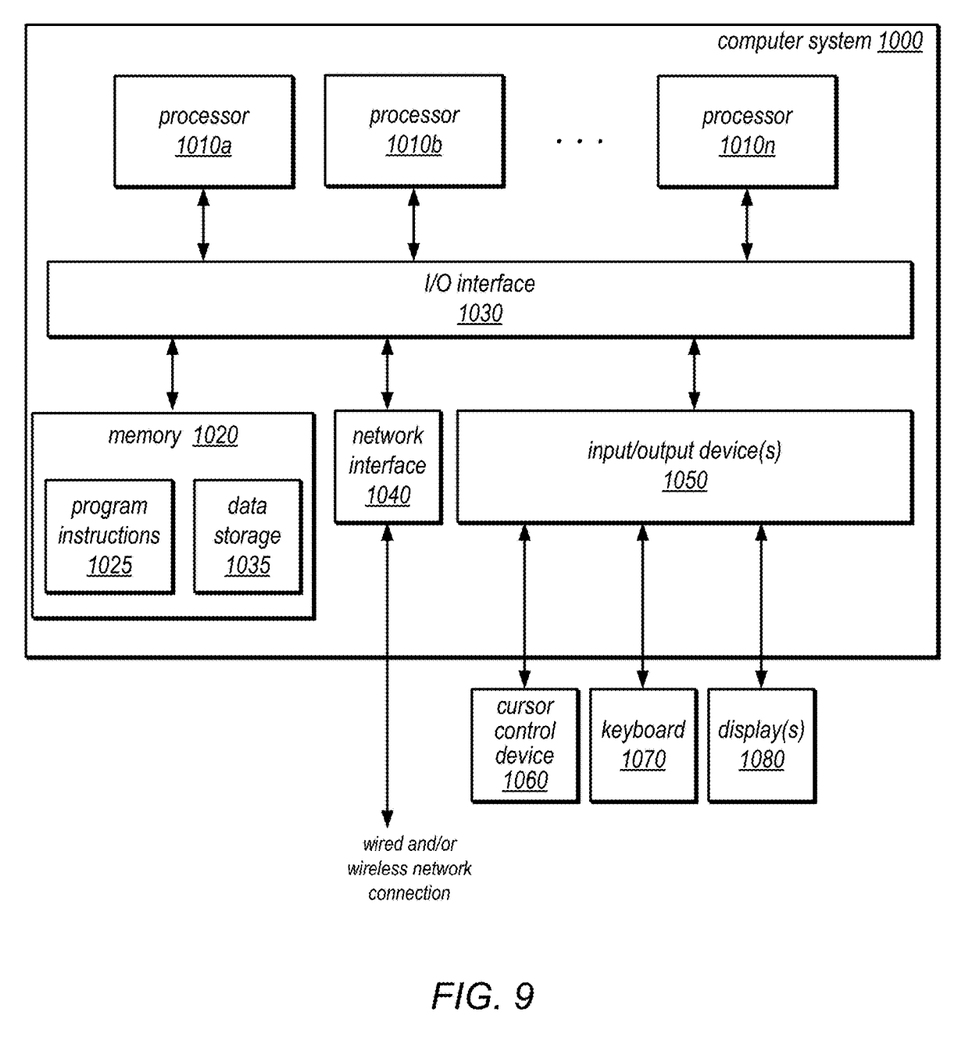
FIG. 9 illustrates an example system to implement the various methods, techniques, and systems described herein, according to some embodiments.

Embodiments of performing explanation jobs for computer vision tasks as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement:
receive, via an interface for a machine learning service, a request to execute an explanation job for a computer vision machine learning model hosted by the machine learning service with respect to an image that specifies an image segmentation technique to apply to the image as part of performing the explanation job;
launch an explanation processing container hosted by the machine learning service to perform the explanation job for the computer vision machine learning model, wherein the explanation job extracts different super pixels according to the image segmentation technique from the image according to a segmentation technique to determine respective relative importance values of the different super pixels on one or more inferences generated by the computer vision machine learning model on the image and generates, based on the respective relative importance values of the different super pixels, one or more heat maps indicating the relative importance values of the different super pixels on performance of the computer vision machine learning model; and
provide, according to a specification of the explanation job, the one or more heat maps as part of a result for the explanation job.

2. The system of claim 1, wherein the computer vision machine learning model performs object detection on the image and wherein the different super pixels are extracted from an object detected in the image.

3. The system of claim 1, wherein the explanation job specifies a context parameter for determining the respective relative importance values of the different features and wherein the overlap parameter indicates an amount of the image to include along with a bounding box for the object detected in the image used to determine the respective relative importance values of the different features.

4. The system of claim 1, wherein the computer vision machine learning model performs image classification on the image.

5. A method, comprising:
receiving, via an interface for a machine learning service, a request to execute an explanation job for a computer vision machine learning model hosted by the machine learning service with respect to an image that specifies an image segmentation technique to apply to the image as part of performing the explanation job;
performing, by the machine learning service, the explanation job for the computer vision machine learning model that extracts different features according to the image segmentation technique from the image to determine respective relative importance values of the different features on one or more inferences generated by the computer vision machine learning model on the image and generate, based on the respective relative importance values of the different features, one or more heat maps indicating the relative importance values of the different features on performance of the computer vision machine learning model; and providing, by the machine learning service, the one or more heat maps as part of a result for the explanation job.

6. The method of claim 5, wherein the computer vision machine learning model performs object detection on the image and wherein the different features are extracted from an object detected in the image.

7. The method of claim 6, wherein the explanation job specifies an overlap parameter for determining the respective relative importance values of the different features, wherein the overlap parameter indicates an amount of overlap between a bounding box for the object detected in the image and a perturbed image used to determine the respective relative importance values of the different features.

8. The method of claim 6, further comprising determining that a confidence value corresponding to the object detected in the image exceeds a probability threshold specified in the explanation job before determining the respective relative importance values of the different features.

9. The method of claim 5, wherein the explanation job specifies a configuration for performing the segmentation technique.

10. The method of claim 5, wherein determining the respective relative importance values of the different features comprises applying a SHapley Additive exPlanations (SHAP) based technique to determine the respective relative importance values.

11. The method of claim 5, wherein determining the respective relative importance values of the different features comprises replacing one or more of the different features with a background image.

12. The method of claim 5, wherein the computer vision machine learning model performs image classification on the image.

13. The method of claim 5, wherein providing the one or more heat maps as part of a result for the explanation job comprises storing a document of the result of the explanation job in a location specified in the explanation job.

14. One or more non-transitory, computer-readable storage media, storing program instructions that when executed on or across one or more computing devices cause the one or more computing devices to implement:

receiving, via an interface for a machine learning service, a request to execute an explanation job for a computer vision machine learning model hosted by the machine learning service with respect to an image that specifies an image segmentation technique to apply to the image as part of performing the explanation job;

causing, by the machine learning service, an explanation processing container hosted by the machine learning service to perform the explanation job for the computer vision machine learning model, wherein the explanation job extracts different features according to the image segmentation technique from the image to determine respective relative importance values of the different features on one or more inferences generated by the computer vision machine learning model on the image and generates, based on the respective relative importance values of the different features, one or more heat maps indicating the relative importance values of the different features; and providing, by the machine learning service, the one or more heat maps as part of a result for the explanation job.

15. The one or more non-transitory, computer-readable storage media of claim 14, wherein the computer vision machine learning model performs object detection on the image and wherein the different features are extracted from an object detected in the image.

16. The one or more non-transitory, computer-readable storage media of claim 15, storing further instructions that when executed on or across the one or more computing devices, cause the one or more computing devise to implement determining that a confidence value corresponding to the object detected in the image exceeds a probability threshold specified in the explanation job before determining the respective relative importance values of the different features.

17. The one or more non-transitory, computer-readable storage media of claim 15, storing further instructions that when executed on or across the one or more computing devices, cause the one or more computing devise to implement determining that the object detected is included in the performance of the explanation job in accordance with a maximum number of detected objects specified in the explanation job.

18. The one or more non-transitory, computer-readable storage media of claim 14, wherein the explanation job specifies a context parameter for determining the respective relative importance values of the different features and wherein the overlap parameter indicates an amount of the image to include along with a bounding box for the object detected in the image used to determine the respective relative importance values of the different features.

19. The one or more non-transitory, computer-readable storage media of claim 14, wherein the interface of the machine learning service comprises a graphical user interface (GUI), and wherein the result of the explanation job is provided via the GUI.

20. The one or more non-transitory, computer-readable storage media of claim 14, wherein the computer vision machine learning model performs image classification on the image.

* * * * *